US006700850B2

United States Patent
Takahashi et al.

(10) Patent No.: US 6,700,850 B2
(45) Date of Patent: Mar. 2, 2004

(54) OPTICAL DISK APPARATUS WITH OPPOSING PROTECTIVE PROTRUSIONS

(75) Inventors: Kazuaki Takahashi, Tokyo (JP); Hiroaki Miyasaka, Tokyo (JP); Shinichi Sudou, Tokyo (JP); Yusuke Izumiya, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 09/983,602

(22) Filed: Oct. 25, 2001

(65) Prior Publication Data

US 2002/0051418 A1 May 2, 2002

(30) Foreign Application Priority Data

Oct. 30, 2000 (JP) ........................ 2000-330525

(51) Int. Cl.[7] ............................................. G11B 17/04
(52) U.S. Cl. ..................................................... 369/75.2
(58) Field of Search ................................ 369/75.2, 77.1

(56) References Cited

U.S. PATENT DOCUMENTS

| 4,641,297 A | * | 2/1987 | Watanabe | 369/75.2 |
|---|---|---|---|---|
| 5,067,121 A | * | 11/1991 | Einhaus | 369/75.2 |
| 5,808,996 A | * | 9/1998 | Aoyama | 369/75.1 |
| 6,014,357 A | * | 1/2000 | Watanabe et al. | 369/75.2 |
| 6,278,677 B1 | * | 8/2001 | Sako et al. | 369/77.1 |
| 6,421,311 B1 | * | 7/2002 | Nakazato et al. | 369/77.1 |
| 6,529,461 B1 | * | 3/2003 | Watanabe et al. | 369/75.2 |

FOREIGN PATENT DOCUMENTS

JP   6-58493   8/1994

* cited by examiner

Primary Examiner—Brian E. Miller
(74) Attorney, Agent, or Firm—Sughrue Mion, PLLC

(57) ABSTRACT

An optical disk apparatus is provided, in which the optical disk tray can slide smoothly in and out, and the insertion and removal of an optical disk is facilitated, and wherein inadvertent scratches are not produced on the optical disk surface, and flying pieces of optical disk damaged during rotation are completely prevented from exiting the apparatus. By dividing a protrusion for preventing a damaged optical disk from flying out of the apparatus into a first protrusion and a second protrusion, with one protrusion provided on an optical disk tray and the other on a support member, any possibility of the optical disk flying out of the apparatus can be completely prevented, even if the height of each of the first and second protrusions is lowered. Because the second protrusion is lowered, the protrusion will not catch on the optical disk tray or the optical disk, and so a smooth sliding operation of the optical disk tray can be ensured.

18 Claims, 6 Drawing Sheets

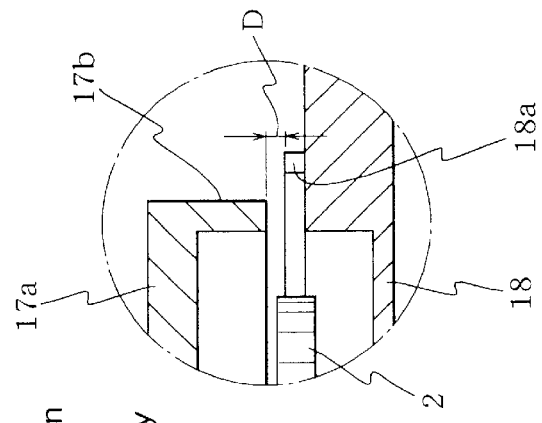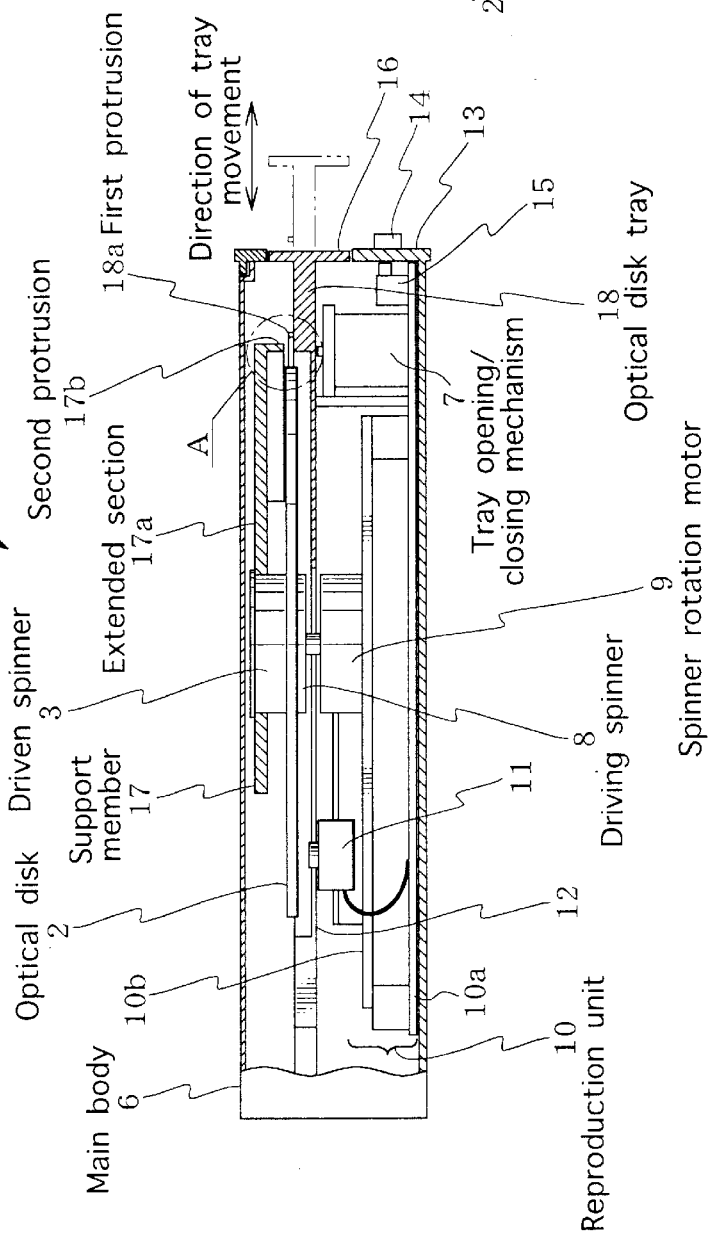

OPTICAL DISK APPARATUS WITH OPPOSING PROTECTIVE PROTRUSIONS

BACKGROUND OF THE INVENTION

1. Field of the Invention

The present invention relates to an improvement for an optical disk apparatus, and more particularly to a safety improvement relating to possible optical disk damage during rotation.

2. Description of the Prior Art

Optical disk apparatuses comprising a driven spinner, a driving spinner and an optical disk tray are already known.

An example of this type of optical disk apparatus is shown in FIG. 5 and FIG. 6. FIG. 5 is a schematic illustration showing a cutaway cross-section along the center of a conventional optical disk apparatus 100. FIG. 6 is a perspective view showing the external appearance of the conventional optical disk apparatus 100.

As can be seen in FIG. 5, the optical disk apparatus 100 comprises a driven spinner 3, a support member 4, an optical disk tray 5, a housing 6, a tray opening/closing mechanism 7, a driving spinner 8, a spinner rotation motor 9, and a reproduction unit 10. The driven spinner 3 retains an optical disk 2. The support member 4 supports the driven spinner 3 in a freely rotatable state. The optical disk tray 5 has a through hole in the center thereof. The tray opening/closing mechanism 7 moves the optical disk tray 5 in and out of the housing 6. The driving spinner 8 moves towards and away from the driven spinner 3 in synchronization with the in and out movement of the optical disk tray 5. The spinner rotation motor 9 rotates the driving spinner 8. The reproduction unit 10 reproduces information obtained from the rotating optical disk 2, and may also incorporate a writing function.

Of the above components, the support member 4 supports the driven spinner 3 in a freely rotatable state, and is fixed to the housing 6, as shown in FIG. 6.

Furthermore, the tray opening/closing mechanism 7 typically comprises a motor, and uses a power transmission mechanism not shown in the figures to slide the optical disk tray 5 in the radial direction of the optical disk 2, in other words, in a left and right direction as shown in FIG. 5, thereby moving the optical disk tray 5 in and out of the housing 6.

The reproduction unit 10 comprises a substrate section 10a and an elevation section 10b, and by moving this elevation section 10b up and down relative to the substrate section 10a using an elevation mechanism not shown in the figures, the driving spinner 8 of the spinner rotation motor 9 provided on the elevation section 10b moves towards and away from the driven spinner 3.

When positioned close to the driven spinner 3, the driving spinner 8 clamps the optical disk 2 in combination with the driven spinner 3, and then rotates the optical disk 2 using the driving force from the spinner rotation motor 9.

A tracer head 11 is one component of the reproduction unit 10, and moves in and out along a slot 12 in the radial direction of the optical disk 2. The slot connects with the through hole provided in the center of the optical disk tray 5.

As follows is a brief description of the opening/closing operation for the optical disk tray 5. First, with the apparatus in the state shown in FIG. 5, if an open/close switch 15 provided inside the housing 6 is operated via a push member 14 on the front panel 13. Then the elevation mechanism (not shown) is activated and lowers the elevation section 10b of the reproduction unit 10. At the same time, the spinner rotation motor 9 and the driving spinner 8 also move downwards, and the optical disk 2, the lower surface of which has been supported by the driving spinner 8, is mounted onto the optical disk tray 5.

In this manner, when the elevation section 10b reaches a lower limit, the tray opening/closing mechanism 7 is then activated and causes the optical disk tray 5 to slide out towards the right of FIG. 5, thereby projecting the optical disk tray 5 outside of the housing 6. In this state, the optical disk 2 can then be removed.

Subsequently, if the open/close switch 15 provided inside the housing 6 is once again operated via the push member 14 on the front panel 13, then the tray opening/closing mechanism 7 is activated again and slides the optical disk tray 5 towards the left of FIG. 5, thereby retracting the optical disk tray 5 inside the housing 6. In this manner, when the optical disk tray 5 reaches the retracted position shown in FIG. 5, the elevation mechanism is once again activated and the elevation section 10b of the reproduction unit 10 is raised. At the same time, the spinner rotation motor 9 and the driving spinner 8 also move upwards, and the optical disk 2, the lower surface of which has been supported by the driving spinner 8, is lifted up off the optical disk tray 5 and pressed against the lower surface of the driven spinner 3.

The optical disk 2, which is clamped between the driving spinner 8 and the driven spinner 3, is then rotated by driving the spinner rotation motor 9. Furthermore, reading or writing of information is then carried out using the tracer head 11, by irradiating a laser light beam while moving the tracer head 11 across the optical disk 2 in a radial direction.

The optical disk apparatus 100 has a face panel 16 which is integrally formed with the optical disk tray 5, and the operation for storing the optical disk tray 5 in the optical disk apparatus 100 can also be performed by pressing the face panel 16 instead of operating the push member 14.

In an optical disk apparatus 100 of this type of construction, the rotational speed of the optical disk 2 was initially assumed to be 200 rpm (CD single speed), and the rigidity and strength of each of the components within the optical disk apparatus 100 were designed for such rotational speeds.

Subsequent improvements in the performance of computers and the like lead to demands for higher reading and writing speeds, and optical disk apparatus 100 of 2-times speed, 4-times speed, and 8-times speed and greater were designed. Recently, optical disk apparatuses 100 with rotational speeds of 9600 rpm (48-times CD single speed) have also been developed.

Moreover, the appearance of optical disks 2 such as CD-ROM disks and the like coincides with the development of the optical disk apparatus 100, and there is a distinct possibility that very early optical disks 2 which have been damaged by scratches or age deterioration may also be used in optical disk apparatus 100 of current specifications.

Although both optical disks 2 and optical disk apparatus 100 have been designed with considerable margins allowed for safety, if an optical disk 2 is damaged during rotation and flies off in a radially outward direction due to the centrifugal force, then in the case where half of an optical disk 2 being rotated in a 9600 rpm optical disk apparatus 100 is torn to pieces for example, the force generated reaches approximately 20.9 Kgf (calculated value). If the optical disk 2 flies directly into the front panel 13 or the face panel 16, then there is no absolute guarantee that the front panel 13 or the face panel 16 could withstand such an impact.

Consequently, in order to resolve this type of problem, an optical disk apparatus has been proposed which comprises a protrusion which protrudes downwards from a position towards the right hand side of the upper inside surface of the housing 6 (refer to position a in FIG. 5), and extends to a position touching the upper surface of the optical disk tray 5.

However, in this type of construction, the optical disk tray 5 may sometimes catch on the protrusion, obstructing the slide operation of the optical disk tray 5.

Furthermore, in cases where the optical disk 2 does not mount perfectly on the optical disk tray 5 and sits with a slight tilt, the tip of the protrusion can rub the surface of the optical disk 2 and generate scratches.

An optical disk apparatus has also been proposed which comprises a circular protrusion on the optical disk tray 5 in a position towards the front of the tray and outside, in a radial direction, the area overlapped by the optical disk 2 (refer to position b in FIG. 5).

However, because this apparatus was constructed to absorb any impact from an optical disk 2 using only the protrusion disposed on the optical disk tray 5, the protrusion on the optical disk tray 5 needs to be built to a height exceeding the rotational plane of the optical disk 2, which then becomes a hindrance in removing the optical disk 2 from the optical disk tray 5. Furthermore, in the case where an optical disk 2 which has flown apart inside the housing 6 rebounds back inside the housing 6, damage to the front panel 13 and the face panel 16 becomes a concern.

SUMMARY OF THE INVENTION

An object of the present invention is to resolve the aforementioned problems associated with the conventional technology, and provide an optical disk apparatus in which the optical disk tray can slide smoothly in and out, and the insertion and removal of an optical disk is simple, and wherein inadvertent scratches are not produced on the optical disk surface, and flying pieces of optical disk damaged during rotation are completely prevented from exiting the apparatus.

The present invention is an optical disk apparatus comprising: a driven spinner for retaining an optical disk; a support member for supporting the driven spinner in a freely rotatable state; an optical disk tray with a through hole in at least a central section thereof; a tray opening/closing mechanism for sliding the optical disk tray in a radial direction of the optical disk and moving the optical disk tray in and out of a housing; a driving spinner which moves towards and away from the driven spinner in synchronization with the in and out movement of the optical disk tray and clamps the optical disk in combination with the driven spinner; a spinner rotation motor for rotating the driving spinner; and a reproduction unit for reproducing information from the rotating optical disk, wherein in order to achieve the aforementioned object, a first protrusion is provided on the optical disk tray in a position towards the front of the tray and outside, in a radial direction, the area overlapped by the optical disk, and a second protrusion facing the first protrusion is positioned on a side of the housing.

Because the protrusion for preventing a damaged optical disk from flying out is separated into a first protrusion and a second protrusion facing to each other, the height of each protrusion can be considerably made lower than the protrusions used in conventional apparatuses.

In particular, because the second protrusion can be constructed to have a lower height, the problem of the protrusion provided on the housing side (the second protrusion) catching on the optical disk tray disappears, and so a smooth sliding operation of the optical disk tray can be ensured. Furthermore, the problem of the protrusion provided on the housing side (the second protrusion) rubbing against the surface of the optical disk and causing inadvertent scratches is also resolved, even for those cases where the optical disk is mounted onto the optical disk tray with a slight tilt.

Furthermore, because the height of the protrusion on the optical disk tray (the first protrusion) can also be lowered, the operations for removing or mounting an optical disk on the optical disk tray are also facilitated.

It is preferable that a gap between the first protrusion and the second protrusion, in a direction of a normal line from the surface of the optical disk, is smaller than the thickness of the optical disk itself.

By making this gap smaller than the thickness of the optical disk, any possibility of a disk becoming damaged and flying out through the gap can be completely prevented.

Furthermore, the first protrusion may also be offset to a position outside the second protrusion in the radial direction of the optical disk.

According to such a configuration, any interference between the first protrusion and the second protrusion during sliding of the optical disk tray can be completely prevented, and moreover because the distance between the outer edge of the optical disk and the first protrusion also increases, the operations for mounting an optical disk on, or removing an optical disk from, the optical disk tray are facilitated even further.

In addition, the first protrusion may also be divided, and positioned on both sides of the optical disk tray, in positions towards the front of the tray and outside, in the radial direction, the area overlapped by the optical disk.

This type of configuration is particularly effective for an optical disk apparatus in which the optical disk tray is not completely exposed when moved out of the housing, in other words an optical disk apparatus wherein owing to a short optical disk tray movement stroke, optical disks need to be inserted into and removed from the optical disk tray by tilting the optical disk and raising the front edge of the disk, in that the configuration prevents the possibility of interference between the optical disk and the first protrusion during insertion and removal of the optical disk.

Furthermore, the first protrusion may also be provided as a continuous single body on the optical disk tray, in a position towards the front of the tray and outside, in the radial direction, the area overlapped by the optical disk.

In comparison with the configuration in which the first protrusion is divided, this configuration offers an improved effect in terms of preventing fragments of a damaged disk flying out of the apparatus.

In addition, the support member can also be formed so as to cover at least the front half of the optical disk, with the second protrusion then being formed as an integral part of the support member.

According to this type of configuration, in addition to those fragments to which the optical disk is torn and which fly out in the radial direction, any optical disk fragments which rebound back inside the housing and then fly off in another direction can also be halted by the support member, effectively preventing such fragments from flying out of the apparatus.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1(a) is a schematic illustration showing a cutaway cross-section along the center of an optical disk apparatus according to an embodiment of the present invention, and FIG. 1(b) is an enlarged view of the essential parts (showing the details of section A);

DETAILED DESCRIPTION OF THE PREFERRED EMBODIMENTS

Figure 2A:
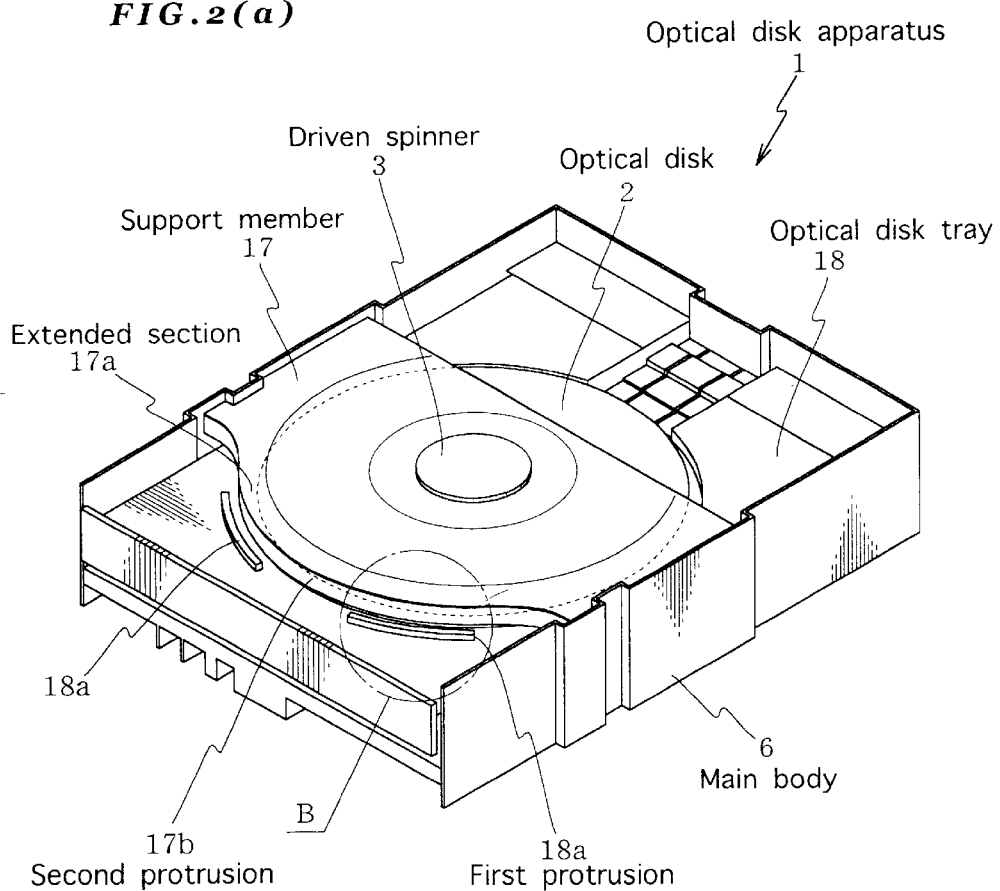
FIG. 2(a) is a perspective view showing the external appearance of the optical disk apparatus of the same embodiment.

Hereinafter, embodiments of the present invention will be described with reference to the drawings. FIG. 1(a) is a schematic illustration showing a cutaway cross-section along the center of an embodiment of an optical disk apparatus 1 according to the present invention. FIG. 2(a) is a perspective view showing the external appearance of the optical disk apparatus 1.

Figure 5:
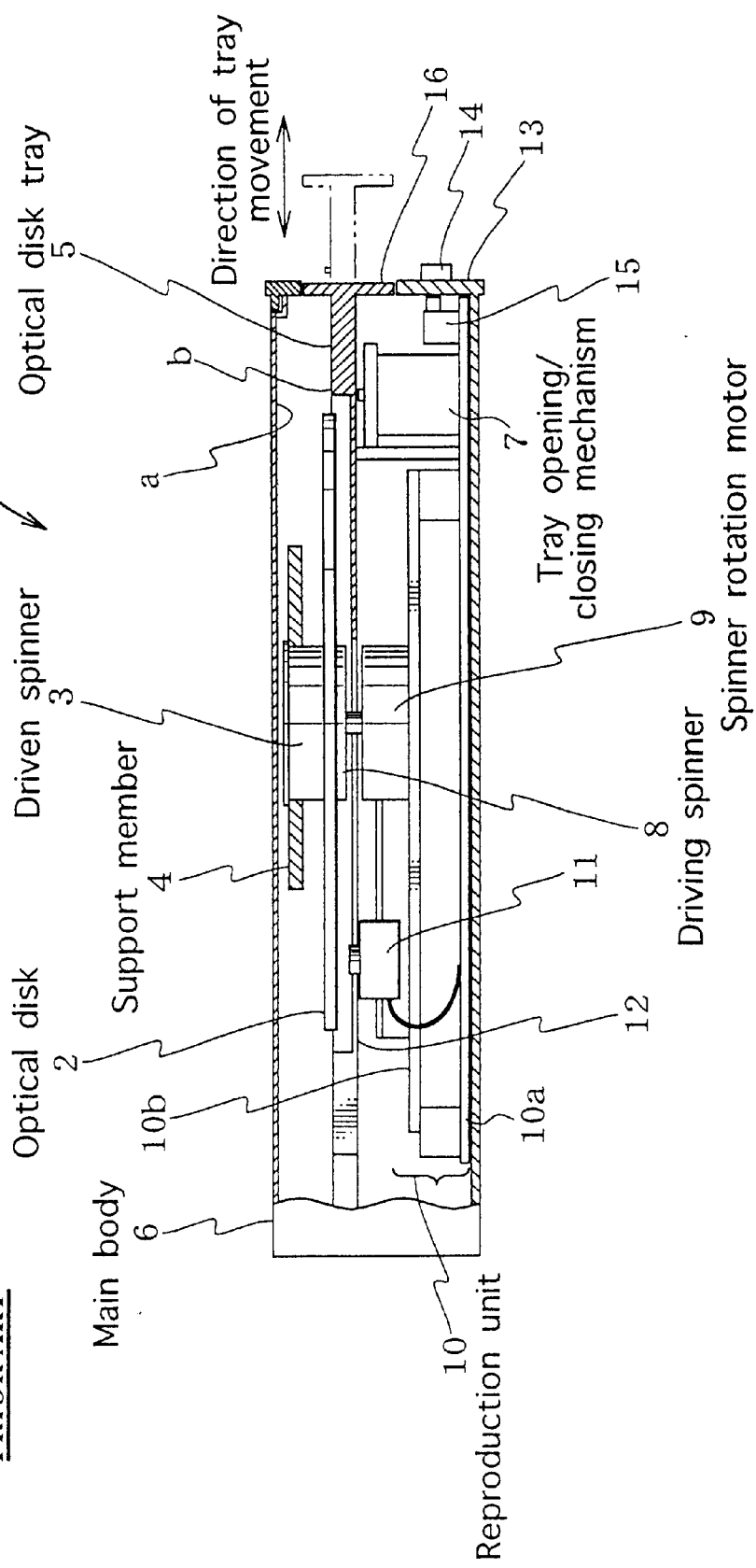
FIG. 5 is a schematic illustration showing a cutaway cross-section along the center of a conventional optical disk apparatus.
Figure 6:
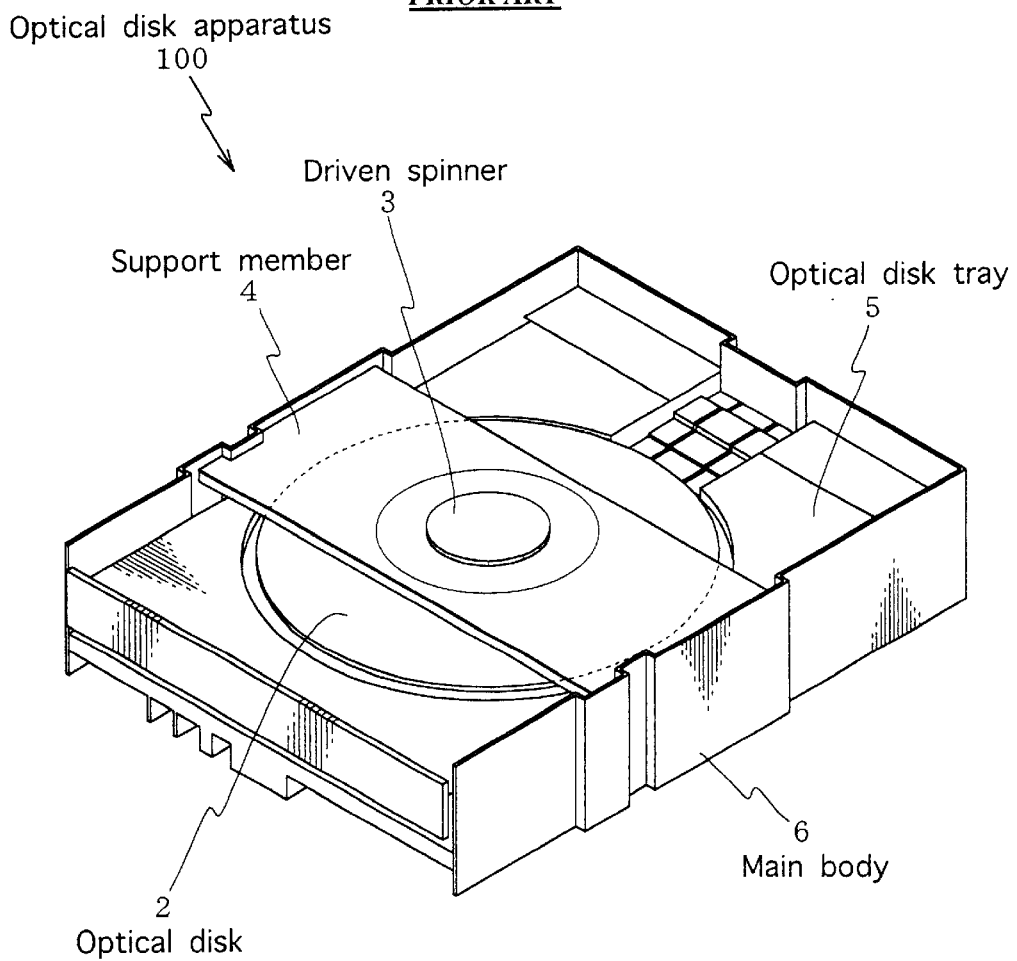
FIG. 6 is a perspective view showing the external appearance of a conventional optical disk apparatus.

Of the components shown, the structure and functions of the optical disk 2, the driven spinner 3, the housing 6, the tray opening/closing mechanism 7, the driving spinner 8, the spinner rotation motor 9, the reproduction unit 10 (the substrate section 10a and the elevation section 10b), the tracer head 11, the slot 12, the front panel 13, the push member 14, the open/close switch 15, and the face panel 16 are the same as those described in relation to the conventional example shown in FIG. 5 and FIG. 6, and so the descriptions therefor are omitted here.

Furthermore, the reproduction unit 10 and the tracer head 11 refer not only to dedicated read only devices, but also to write only devices, and devices which combine both read and write functions.

As follows is a detailed description of the construction of a support member 17 and an optical disk tray 18 which relate directly to the purport of the present invention.

The support member 17 supports the driven spinner 3 in a freely rotatable state, and is fixed at both sides to the housing 6, as shown in FIG. 2(a). The differences between the support member 17 and the support member 4 shown in FIG. 5 and FIG. 6, are the fact that the support member 17 comprises a semicircular extended section 17a covering from the central region of the optical disk 2 right out to the front half of the disk, and the fact that a second protrusion 17b formed from an integrated peripheral wall which extends down towards the optical disk tray 18 is provided on the lower surface at the outer periphery of the extended section 17a.

The extended section 17a of the support member 17 prevents any pieces of optical disk which break and fly off inside the housing 6 from rebounding about inside the housing 6 and colliding with the front panel 13 or the face panel 16. Furthermore, the second protrusion 17b provided on the extended section 17a, in combination with first protrusions 18a, 18a described below, prevents any pieces of optical disk which break and fly off inside the housing 6 from colliding directly with the front panel 13 or the face panel 16. Details relating to the shape of the second protrusion 17b are shown in FIG. 1(b) and FIG. 2(b).

In contrast, first protrusions 18a which face the aforementioned second protrusion 17b are separately provided as integral parts of the optical disk tray 18, in positions on both sides of the optical disk tray 18, near the front of the tray and outside, in the radial direction, the area overlapped by the optical disk 2.

Figure 2B:
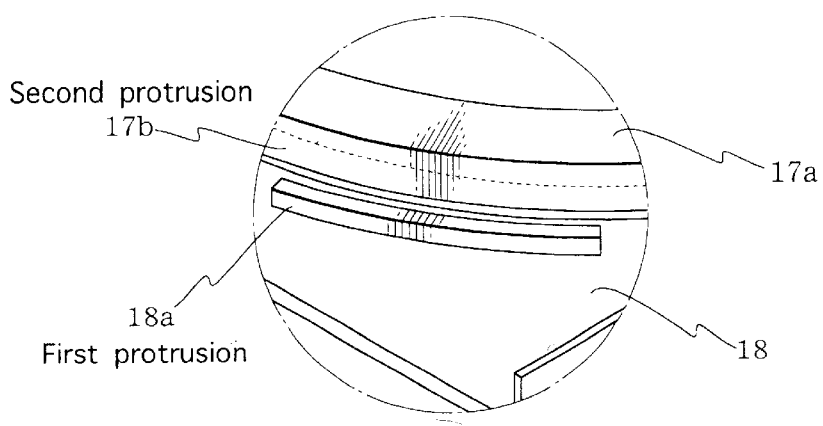
FIG. 2(b) is an enlarged view of the essential components (showing the details of section B)

As shown in FIG. 1(a), FIG. 1(b) and FIG. 2(b), the first protrusions 18a are offset to positions outside the second protrusion 17b in the radial direction of the optical disk 2, and so inadvertent interference between each of the first protrusions 18a and the second protrusion 17b resulting from the sliding of the optical disk tray 18 during opening/closing operations is prevented, and a smooth slide operation is achieved for the optical disk tray 18.

In FIG. 1(a) and FIG. 1(b), the state of the optical disk tray 18 when completely stored is shown by the solid lines, and the optical disk tray 18 does not move any further left than the position shown.

In addition, as a result of this offset, a gap is formed between the front edge of the optical disk 2 and each of the first protrusions 18a, so that the first protrusions 18a do not interfere with the hand or the optical disk 2 during insertion and removal of the optical disk 2. Consequently, both the operation for mounting an optical disk 2 on the optical disk tray 18, and the operation for removing the optical disk 2 from the optical disk tray 18 can be completed smoothly and with minimal effort.

Moreover, because the gap D between each tip of the first protrusions 18a and the tip of the second protrusion 17b is designed to be smaller than the thickness of the optical disk 2, any possibility of a fragment from an optical disk 2 flying out through the gap between the first protrusion 18a and the second protrusion 17b can be completely prevented, thereby enabling the front panel 13 and the face panel 16 to be completely protected from direct impact by fragments of the optical disk 2.

Furthermore, as shown in FIG. 2(a), because a flat section with no unnecessary projections is formed between the two first protrusions 18a positioned at either side of the optical disk tray 18, even in the case of an optical disk apparatus 1 in which the optical disk tray 18 is not completely exposed when moved out of the housing 6, in other words an optical disk apparatus 1 wherein owing to a short movement stroke for the optical disk tray 18, optical disks 2 need to be inserted into and removed from the optical disk tray 18 by tilting the optical disk 2 and raising the front edge of the disk, the surface of the optical disk 2 will still not contact the first protrusion 18a during insertion or removal of the optical disk 2, and so insertion and removal operations can be carried out safely.

Figure 3:
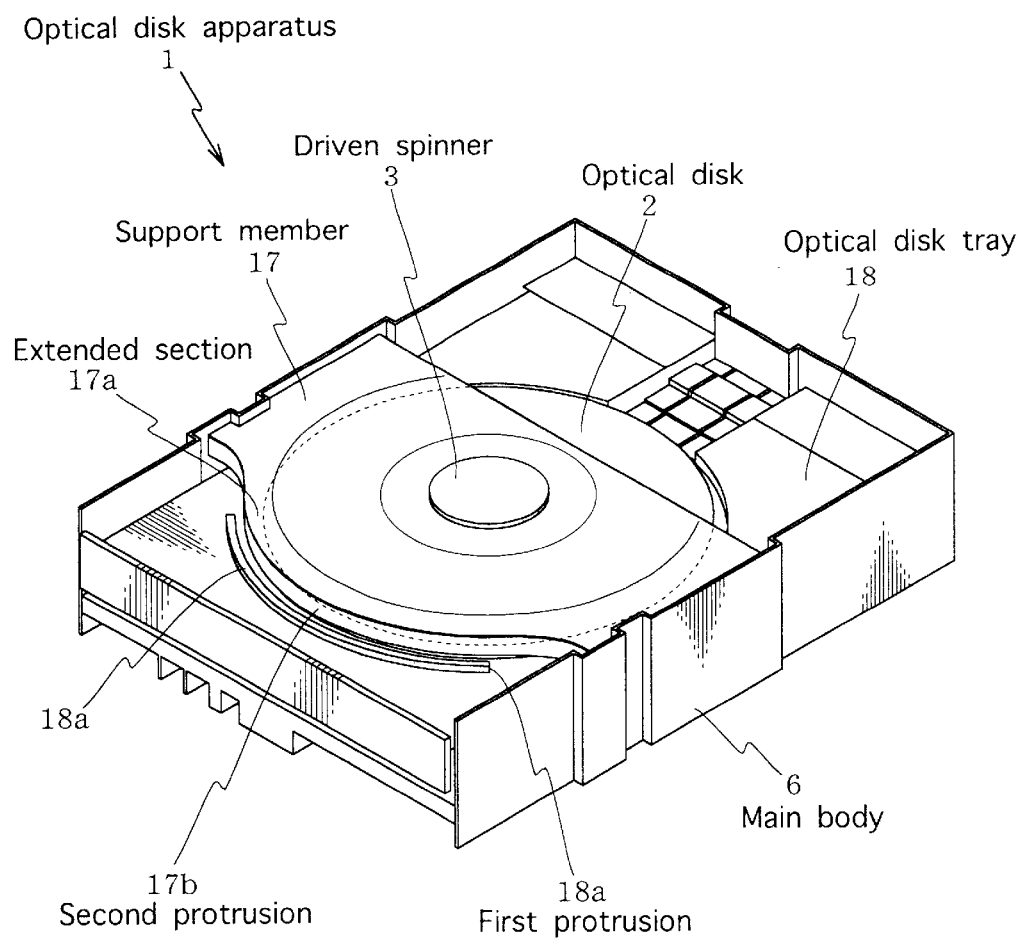
FIG. 3 is a perspective view showing the external appearance of an optical disk apparatus of another embodiment.

In contrast, in the case of an optical disk apparatus 1 in which the optical disk tray 18 is completely exposed when moved out of the housing 6, then as shown in FIG. 3, the first protrusion 18a can be provided as a continuous single body in a position towards the front of the optical disk tray and outside, in the radial direction, the area overlapped by the optical disk 2. Such a configuration is able to prevent fragments of a damaged disk flying out of the apparatus with an even greater degree of certainty.

Figure 4:
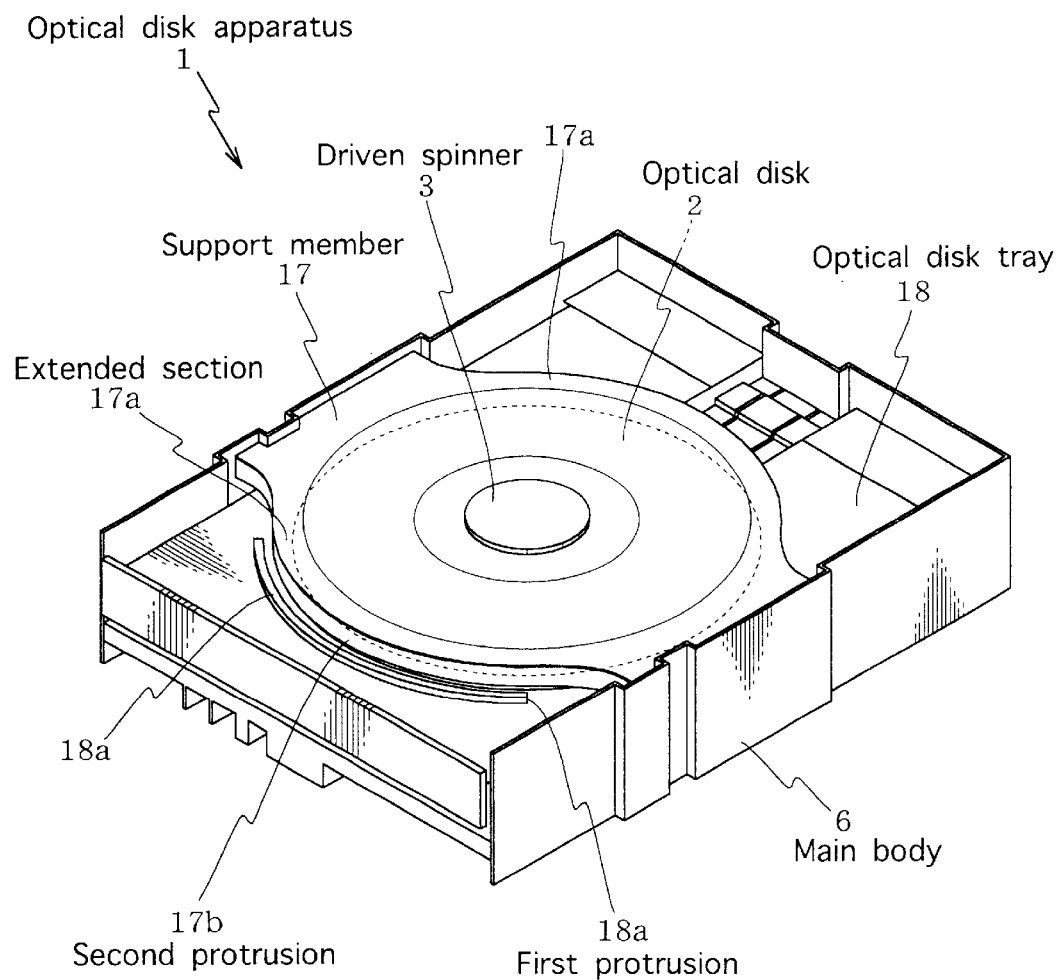
FIG. 4 is a perspective view showing the external appearance of an optical disk apparatus of yet another embodiment.

The embodiment described above was provided with the first protrusion 18a, the extended section 17a, and the second protrusion 17b only at the front side of the optical disk tray 18 and the support member 17. However, the first protrusion 18a, the extended section 17a, and the second protrusion 17b could also be provided at the rear of the optical disk tray 18 and the support member 17 simultaneously, and with such a construction, any possibility of fragments flying out through the back panel of the housing 6 could also be completely prevented. The action and effects of such a construction are identical with those described above, and differ only in terms of the direction in which the fragments are flying, and consequently no further description is given here, although the external appearance of this type of modified construction is shown in FIG. 4.

In the optical disk apparatus of the present invention, since the protrusion for preventing a damaged optical disk from flying out of the apparatus is divided into the first protrusion and the second protrusion, with one protrusion provided on the optical disk tray and the other on the housing side of the disk apparatus, any possibility of the optical disk flying out of the apparatus can be completely prevented, even if the height of each protrusion is lowered.

In particular, because the second protrusion can be constructed to have a lower height, the problem of the protrusion provided on the housing side catching on the optical disk tray disappears, and so a smooth sliding operation of the optical disk tray can be ensured. Furthermore, the problem of the protrusion provided on the housing side rubbing against the surface of the optical disk and causing inadvertent scratches is also resolved, even for those cases where the optical disk is mounted onto the optical disk tray with a slight tilt.

Furthermore, because the height of the protrusion on the optical disk tray can also be lowered, the operations for removing or mounting an optical disk on the optical disk tray are also facilitated.

Moreover, because the gap between the first protrusion and the second protrusion, in the direction of a normal line from the surface of the optical disk, is smaller than the thickness of the optical disk itself, any possibility of a disk becoming damaged and flying out through the gap can be completely prevented, thereby effectively preventing flying fragments.

In addition, because the first protrusion is offset to a position outside the second protrusion in the radial direction of the optical disk, any interference between the first protrusion and the second protrusion during sliding of the optical disk tray can be completely prevented.

Moreover with such a construction, because the distance between the first protrusion provided on the optical disk tray and the outer edge of the optical disk increases, the operations for mounting an optical disk on, or removing an optical disk from, the optical disk tray are facilitated even further.

Furthermore, by dividing the first protrusion, and positioning the divided sections on both sides of the optical disk tray in positions towards the front of the tray, the problem which can arise in an optical disk apparatus in which the movement stroke of the optical disk tray is too short, wherein the optical disk and the first protrusion come in contact during insertion and removal of the optical disk, can be effectively prevented.

In contrast, in an optical disk apparatus in which the movement stroke of the optical disk tray is sufficiently long, by providing the first protrusion as a continuous single body on the optical disk tray, in a position towards the front of the tray, an improved effect can be realized in terms of preventing fragments of a damaged optical disk flying out of the apparatus.

In addition, because the support member to which the second protrusion is provided is formed so as to cover at least the front half of the optical disk, in addition to preventing those fragments to which the optical disk is torn and which fly out in radial direction, this support member can also effectively prevent any optical disk fragments which rebound back inside the housing and then fly off in another direction.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-330525 (Filed on Oct. 30, 2000) including specification, claims, drawings and summary are incorporated herein by reference in its entirety.

What is claimed is:

1. An optical disk apparatus comprising:
   a driven spinner for retaining an optical disk;
   a support member for supporting said driven spinner in a freely rotatable state;
   an optical disk tray with a through hole in at least a central section thereof;
   a tray opening/closing mechanism for sliding said optical disk tray in a radial direction of said optical disk and moving said optical disk tray in and out of a housing;
   a driving spinner which moves towards and away from said driven spinner in synchronization with said in and out movement of said optical disk tray and clamps said optical disk in combination with said driven spinner;
   a spinner rotation motor for rotating said driving spinner; and
   a reproduction unit for reproducing information from said rotating optical disk, wherein
   a first protrusion is provided on said optical disk tray in a position towards the front of said tray and outside, in a radial direction, an area overlapped by said optical disk, and a second protrusion facing said first protrusion is positioned on a side of said support member.

2. The optical disk apparatus according to claim 1, wherein a gap between said first protrusion and said second protrusion in a direction of a normal line relative to said optical disk is smaller than a thickness of said optical disk.

3. The optical disk apparatus according to claim 2, wherein said first protrusion is offset outside said second protrusion in a radial direction of said optical disk.

4. The optical disk apparatus according to claim 1, wherein said first protrusion is divided and provided on said optical disk tray in positions on both sides, towards the front of said tray and outside, in the radial direction, said area overlapped by said optical disk.

5. The optical disk apparatus according to claim 2, wherein said first protrusion is divided and provided on said optical disk tray in positions on both sides, towards the front of said tray and outside, in the radial direction, said area overlapped by said optical disk.

6. The optical disk apparatus according to claim 3, wherein said first protrusion is divided and provided on said optical disk tray in positions on both sides, towards the front of said tray and outside, in the radial direction, said area overlapped by said optical disk.

7. The optical disk apparatus according to claim 1, wherein said first protrusion is provided as a continuous single body on said optical disk tray in a position towards the front of said tray and outside, in the radial direction, said area overlapped by said optical disk.

8. The optical disk apparatus according to claim 2, wherein said first protrusion is provided as a continuous single body on said optical disk tray in a position towards the front of said tray and outside, in the radial direction, said area overlapped by said optical disk.

9. The optical disk apparatus according to claim 3, wherein said first protrusion is provided as a continuous single body on said optical disk tray in a position towards the front of said tray and outside, in the radial direction, said area overlapped by said optical disk.

10. The optical disk apparatus according to claim 1, wherein said support member covers at least the front half of said optical disk, and said second protrusion is formed as an integral part of said support member.

11. The optical disk apparatus according to claim 2, wherein said support member covers at least the front half of said optical disk, and said second protrusion is formed as an integral part of said support member.

12. The optical disk apparatus according to claim 3, wherein said support member covers at least the front half of said optical disk, and said second protrusion is formed as an integral part of said support member.

13. The optical disk apparatus according to claim 4, wherein said support member covers at least the front half of said optical disk, and said second protrusion is formed as an integral part of said support member.

14. The optical disk apparatus according to claim 5, wherein said support member covers at least the front half of said optical disk, and said second protrusion is formed as an integral part of said support member.

15. The optical disk apparatus according to claim 1, wherein said second protrusion is positioned on the bottom of the outer perimeter of said support member.

16. The optical disk apparatus according to claim 1, wherein said support member is arranged between an inner side of a main body of said disk apparatus, is generally planar and extends in a direction generally parallel to said optical disk from said driven spinner to a position radially outside said area overlapped by said optical disk.

17. The optical disk apparatus according to claim 1, wherein said first protrusion and said second protrusion protrude and extend in generally axial directions with respect to said optical disk.

18. The optical disk apparatus according to claim 1, wherein said support member covers all of said optical disk, and said second protrusion is formed as an integral part of said support member.

* * * * *